United States Patent
Son et al.

(10) Patent No.: US 7,450,525 B2
(45) Date of Patent: Nov. 11, 2008

(54) METHOD FOR DISCOVERING TOPOLOGY IN ETHERNET NETWORK

(75) Inventors: Myung-Hee Son, Daejon (KR); Bheom-Soon Joo, Daejon (KR); Hae-Won Jung, Daejon (KR)

(73) Assignee: Electronics and Telecommunications Research Institute (KR)

( * ) Notice: Subject to any disclaimer, the term of this patent is extended or adjusted under 35 U.S.C. 154(b) by 596 days.

(21) Appl. No.: 11/229,266

(22) Filed: Sep. 15, 2005

(65) Prior Publication Data

US 2006/0133299 A1 Jun. 22, 2006

(30) Foreign Application Priority Data

Dec. 16, 2004 (KR) ...................... 10-2004-0107203

(51) Int. Cl.
H04L 12/28 (2006.01)
G06F 15/173 (2006.01)
(52) U.S. Cl. ........................ 370/254; 370/400; 709/223
(58) Field of Classification Search ......... 370/254–256, 370/400, 401; 709/223, 224
See application file for complete search history.

(56) References Cited

U.S. PATENT DOCUMENTS

| | | | | |
|---|---|---|---|---|
| 5,850,397 A * | 12/1998 | Raab et al. | .................. | 370/392 |
| 6,377,987 B1 * | 4/2002 | Kracht | ........................ | 709/220 |
| 6,516,345 B1 * | 2/2003 | Kracht | ........................ | 709/220 |
| 6,574,663 B1 | 6/2003 | Bakshi et al. | | |
| 7,200,120 B1 * | 4/2007 | Greenberg et al. | .......... | 370/254 |
| 2005/0125518 A1 * | 6/2005 | Knees et al. | ................. | 709/223 |
| 2005/0198216 A1 * | 9/2005 | Behera et al. | ................ | 709/220 |

OTHER PUBLICATIONS

"Topology Discovery in Heterogeoneous IP Networks", Y. Breitbart, et al., IEEE Infocom, vol. 1, Mar. 2000, pp. 265-274.
"Topology Discovery for Large Ethernet Network", Bruce Lowekamp, et al., ACM SIGCOMM, Aug. 2001, pp. 237-248.
"Physical Topology Discovery for Large Multi-Subnet Networks", Y. Bejerano, et al., IEEE Infocom, vol. 1, Mar. 2003,pp. 342-352.

* cited by examiner

*Primary Examiner*—Hong Sol Cho
(74) *Attorney, Agent, or Firm*—Blakely, Sokoloff, Taylor & Zafman

(57) ABSTRACT

Provided is a topology discovery method for an Ethernet network that can effectively discover a physical topology with respect to the Ethernet network of a mesh structure without developing and using a separate control protocol. The topology discovery method in an Ethernet network includes the steps of: acquiring an interface management information base (MIB) and a bridge MIB; defining and storing information for discovering a physical topology; discovering an edge bridge that divides a boundary between a bridge network and a host network; discovering the physical topology with respect to the bridge network by using the schema; discovering the connection relationship with the host network by using an address learning address forwarding table (AFT) with respect to the edge bridge included in the bridge network; and outputting the connection relationship of the bridge network and the host network as a graph.

7 Claims, 4 Drawing Sheets

METHOD FOR DISCOVERING TOPOLOGY IN ETHERNET NETWORK

FIELD OF THE INVENTION

The present invention relates to a method for discovering a topology in an Ethernet network; and, more particularly, to a topology discovery method in an Ethernet network that effectively discovers a physical topology with respect to an Ethernet network of a mesh structure without developing and using a separate control protocol. A physical topology with respect to a bridge network or a host network can be discovered based on an interface Management Information Base (MIB) and a bridge MIB information, which are a standard MIB of a mesh-structured Ethernet network.

DESCRIPTION OF RELATED ART

A metro Ethernet network can be built by directly connecting an Ethernet switch L2/L3 to a giga-bit Ethernet network without a conventional router or an optical transmission device. Thus, a network design is simplified.

Topology means a network configuration. The topology is divided into a physical topology according to a physical structure, a logical topology according to a logical structure. Topologies include the structures of a star type, a ring type, a bus type and a mesh type according to a shape.

A star topology has a structure that all devices are connected in a point-to-point method from a control point in the center, and a central control node has the authority and the responsibility for controlling communication. Since the central control node controls all nodes, the whole network does not work in case of a central control node trouble, but the node trouble except the central control node does not affect the network.

A ring topology, which is called a ring-shaped or a loop-shaped topology, follows a method that each node accesses in a form of a ring. That is, the data on transmission are transmitted through a ring until a destination is found, and the data are removed from the ring after arriving at the destination. Since the front head of the signal includes information on the address of a destination, signals that arrive at a node except the destination are ignored. The ring topology has a merit that a long distance network can be formed, but if there is any problem in any one node, the whole network cannot be operated.

A bus topology is a most widely-used structure when one main line is set up and lines are diverged from the main line and connected with computers. All nodes are connected to a bus in a form of a letter T and a terminator is put at an end of the bus. Since the bus topology includes the address of a destination in a message just as the ring topology, only the related node can receive and process the message. In the ring topology, each node does not have a responsibility to control a data flow or a network, but in the bus topology, each node is responsible for a communication function as well as a message check. The failure of each node does not affect any other parts, but a node increase reduces speed.

The mesh topology has a structure that some nodes are connected according to a point-to-point circuit forming method, but all nodes are not directly connected. If each node is connected to more than two stations, it is possible to transmit/receive data through another channel in case of trouble. Since the mesh topology can provide a reliable service at a low price, it is mainly used in a long distance communication network.

Since the metro Ethernet is inexpensive compared with another media, it is possible to provide a highly reliable service at a low cost by using a mesh topology.

A topology discovery is a procedure that determines a topology or a resource condition of links in a network. A topology discovery method with respect to an Internet protocol (IP) network or a topology discovery method of a tree structure generated by a spanning tree protocol (STP) in the metro Ethernet network has been studied, but in fact, there is no effective and exact topology discovery method with respect to the metro Ethernet network of the tree structure.

Generally, the metro Ethernet network improves economical efficiency by building the network in a mesh structure and increases network safety by providing a multi-path between nodes. However, in the respect of forwarding, the mesh topology has a problem that a loop can be generated. The IP network can release the loop by the Time-to-Live (TTL) value of an IP header, but since there is no related information in an Ethernet header, the logical topology of the tree structure generated by the STP without the loop can be used.

Therefore, an effective method for discovering an exact physical topology with respect to the Ethernet network of the mesh structure is required urgently except the tree structure generated by the STP.

SUMMARY OF THE INVENTION

It is, therefore, an object of the present invention to provide a topology discovery method in an Ethernet network that can effectively discover a physical topology with respect to an Ethernet network of a mesh structure without developing and using a separate control protocol. A physical topology with respect to a bridge network or a host network can be discovered based on an interface Management Information Base (MIB) and a bridge MIB information, which are a standard MIB of a mesh-structured Ethernet network.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a topology discovery method in an Ethernet network, including the steps of: acquiring an interface Management Information Base (MIB) and a bridge MIB upon a signal from outside requesting to start physical topology discovery with respect to the Ethernet network; defining and storing information for discovering a physical topology based on the acquired interface MIB and the Bridge MIB in a schema; discovering edge bridges that provides a border between a bridge network and a host network by using the schema; discovering the physical topology with respect to the bridge network by using the schema; discovering the connection relationship between the host network and the edge bridge included in the bridge network by using an address learning address forwarding table (AFT); and outputting the connection relationship of the bridge network and the host network as a graph.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
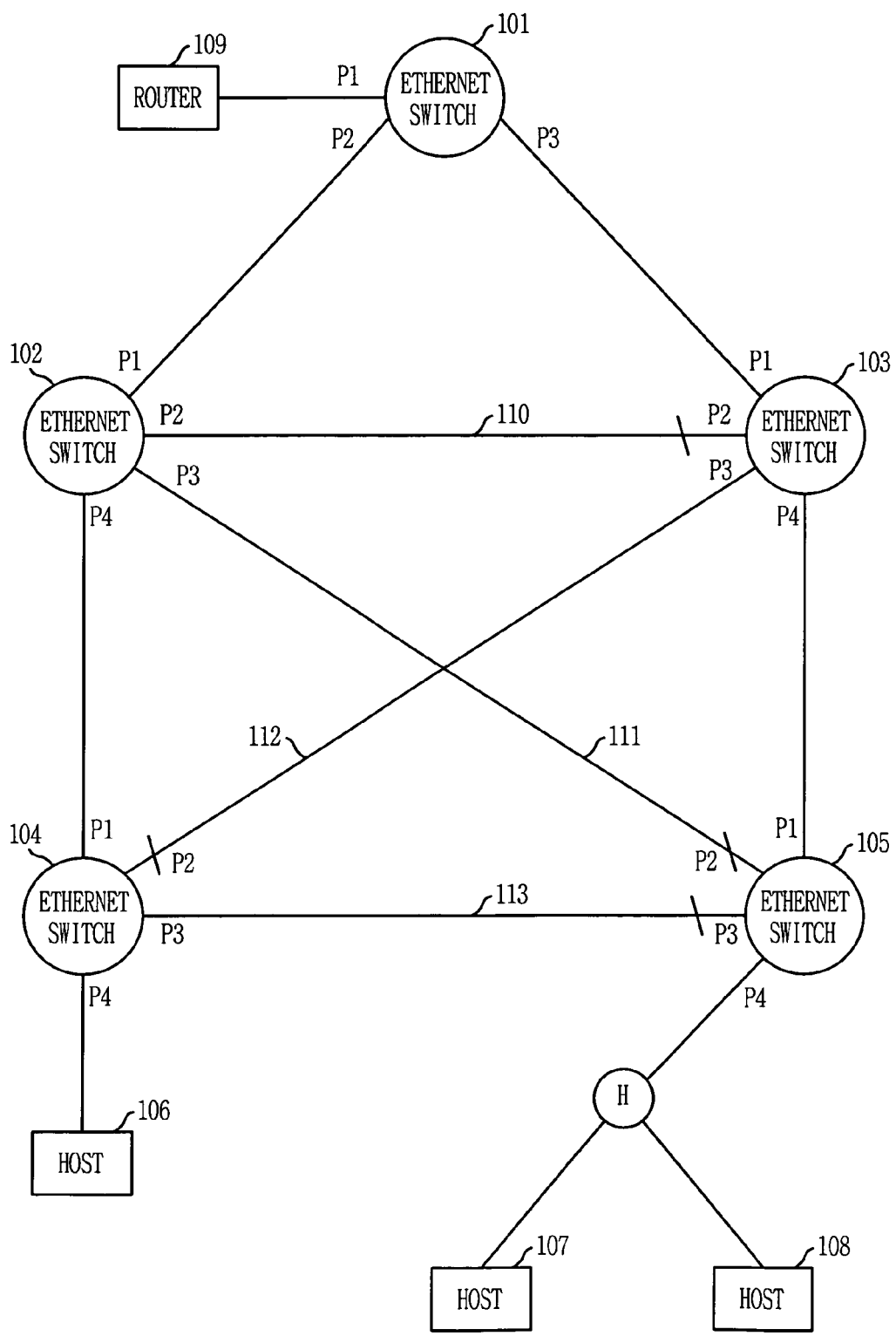
FIG. 1 is a block diagram showing an Ethernet network in accordance with an embodiment of the present invention.

FIG. 1 is a block diagram showing an Ethernet network in accordance with an embodiment of the present invention.

As shown in FIG. 1, the Ethernet network of the present invention includes five Ethernet switches 101, 102, 103, 104, 105, three hosts 106, 107, 108, and one router 109.

Generally, the router is considered to be the same device with a host in an Ethernet network. In the present invention, the physical Ethernet topology is discovered by discovering loop forming paths 110, 111, 112 and 113 which are removed from a spanning tree inside a bridge network. In a host network, structures 106 and 109 when the host is directly connected to edge Ethernet switches 101, 104, and 105, and star structures 107 and 108 when a plurality of hosts are connected to the edge Ethernet switch through a hub can be discovered.

A whole operation of the present invention will be described in detail hereinafter with reference to FIG. 2.

Figure 2:
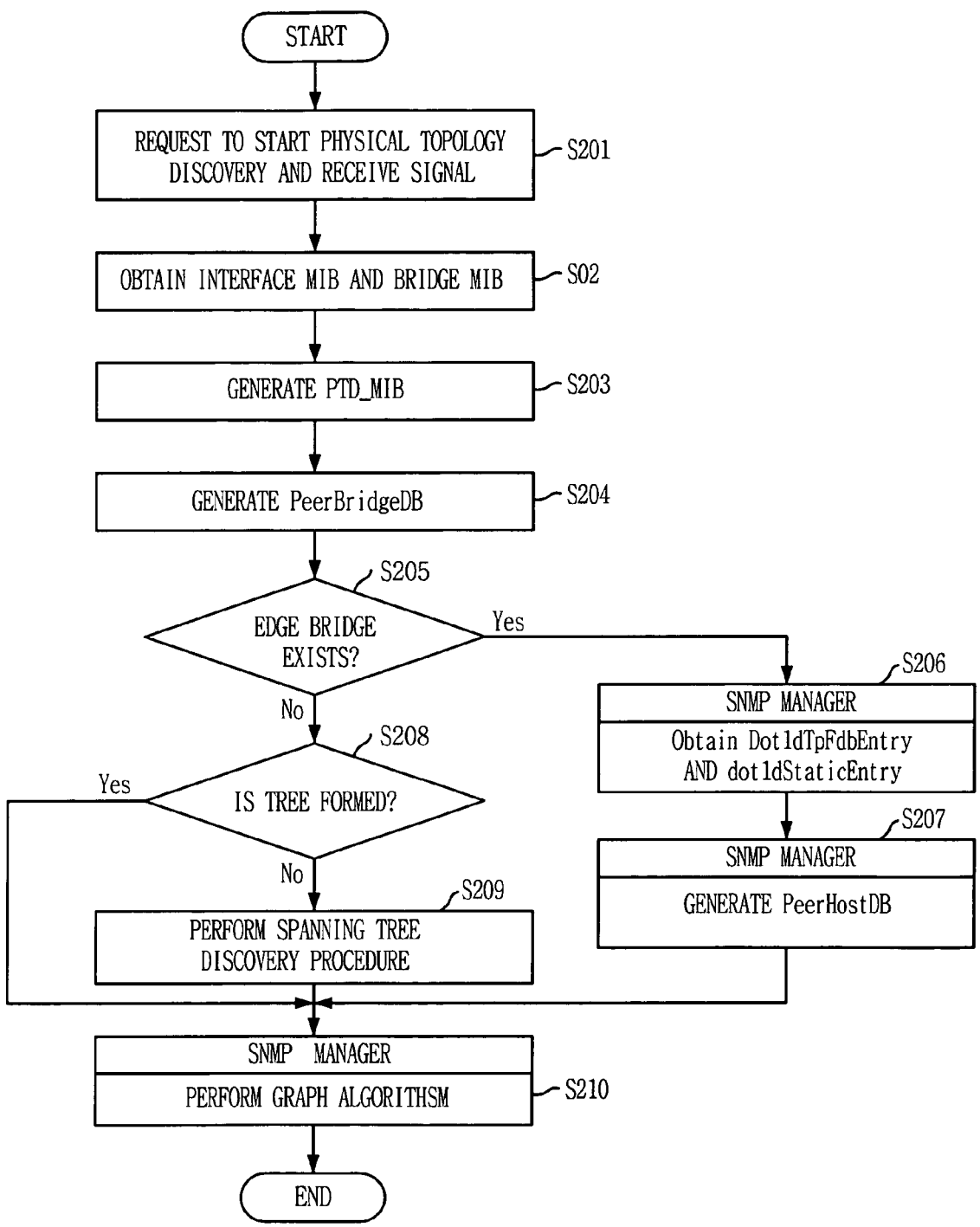
FIG. 2 is a flowchart showing a topology discovery method in an Ethernet network in accordance with an embodiment of the present invention.

FIG. 2 is a flowchart showing a topology discovery method in an Ethernet network in accordance with an embodiment of the present invention.

At step S201, when a network management device receives a signal that requests to start physical topology discovery from a graphic user interface (GUI), at step S202, the network management device questions an interface Management Information Base (MIB) and a bridge MIB to each agent and acquires a value. Herein, the MIB is management information items which are systematized to monitor and control network devices. In the MIB, the network device management information is maintained statically or dynamically, and the network device receives and changes the contents.

At step S203, the network management device defines information for discovering a physical topology as a schema, which is called 'physical topology discovery-MIB (PTD-MIB)', based on the acquired interface MIB and the Bridge MIB and stores the information in own system database. At step S204, information for discovering a connection of the Ethernet network, i.e., a connection relationship of a bridge network, is defined as a schema 'PeerBridgeDB', and topology information inside the bridge network is stored. The structure of "PTD-MIB" schema and "PeerBridgeDB" schema will be described hereinafter.

PTD-MIB={agent_ip, ifEntry.ifOperStatus, dot1dBaseInfo, dot1dBaseBridgeAddress, dot1dStp.dot1dStpRootPort, dot1dStpPortEntry.dot1dStpPortEnable, dot1dStpPortEntry.dot1dStpPortDesignatedBridge, dot1dStpPortEntry.dot1dStpPortDesignatedPort}

PeerBridgeDB={agent_ip, dot1dBridgeAddress, dot1dStpPort, dot1dStpPortDesignatedBridge}

At step S205, the network management device checks if the edge bridge exists in the Ethernet network by using the value stored in the "PTD-MIB" schema and "PeerBridgeDB" schema. The edge bridge is a bridge that has more than one host and one interface among devices of the Ethernet network in a concept defined in the present invention. That is, if the number of interfaces having the "ifEntry.ifOperStatus" value of the interface MIB as 1 is larger than the number of an interface having the "dot1dStpPortEnable" value of interface MIB as 1, an agent becomes an edge bridge.

Herein, if the value of "ifEntry.ifOperStatus" is 1, the interface is activated, and if the value of "dot1dStpPortEnable" is 1, the spanning tree protocol (STP) of the interface is activated. A network operator should activate STP protocol with respect to the interface connected to a switching network only among ports of a device since a loop is not created in case of having the interface in the host network.

As a result of the step S205, if the edge bridge exists, each edge bridge acquires values of "dot1dTpFdbEntry" and "dot1dStaticEntry" from the network management agent to discover the host network connected to itself. At step S206, "PeerHostDB" schema is defined. At step S207, the interface MIB and the bridge MIB acquired from the step S202 are applied to the defined "PeerHostDB" schema and stored in own system database. At step S210, a graph algorithm for expressing a spanning tree is performed. Herein, the structure of the "PeerHostDB" schema is as following.

PeerHostDB={agent_ip, dot1dTpFdbAddress, dot1dTpFdbPort}

If the bridge is not the edge bridge in the step S205, the bridge determines the presence of a tree formation at step S208. Herein, if a root bridge is discovered in case of a spanning tree, it is determined that a tree is formed. Otherwise, it is determined that a tree is not formed. That is, the number of an agent that the value of "dot1dStpRootPort" is 0 is only one, the agent is a root bridge and it is determined that the present Ethernet network is in a state that the spanning tree is formed. Otherwise, it is determined that the present Ethernet network is in a state that the spanning tree is being formed At the step S208, if the tree is formed, at step S209, a spanning tree discovery procedure for expressing the spanning tree, which is a logical path, is performed and at step S210, a graph algorithm for expressing a mesh structure, which is a physical path is performed. At the step S210, if a tree is not formed, a graph algorithm is performed to express the physical path. Herein, the procedure for discovering the spanning tree includes calculating a tree, checking a port state and showing connectivity between agents with respect to the path having a forwarding state only. Since a technology for a spanning tree discovery is a well-known conventional technology before the filing of the present application and it is determined that the technology departs from the scope of the invention, the detailed description will not be provided herein.

The procedure for discovering a physical connection relationship between bridges in the Ethernet network having a mesh structure will be described hereinafter referring to FIG. 3.

Figure 3:
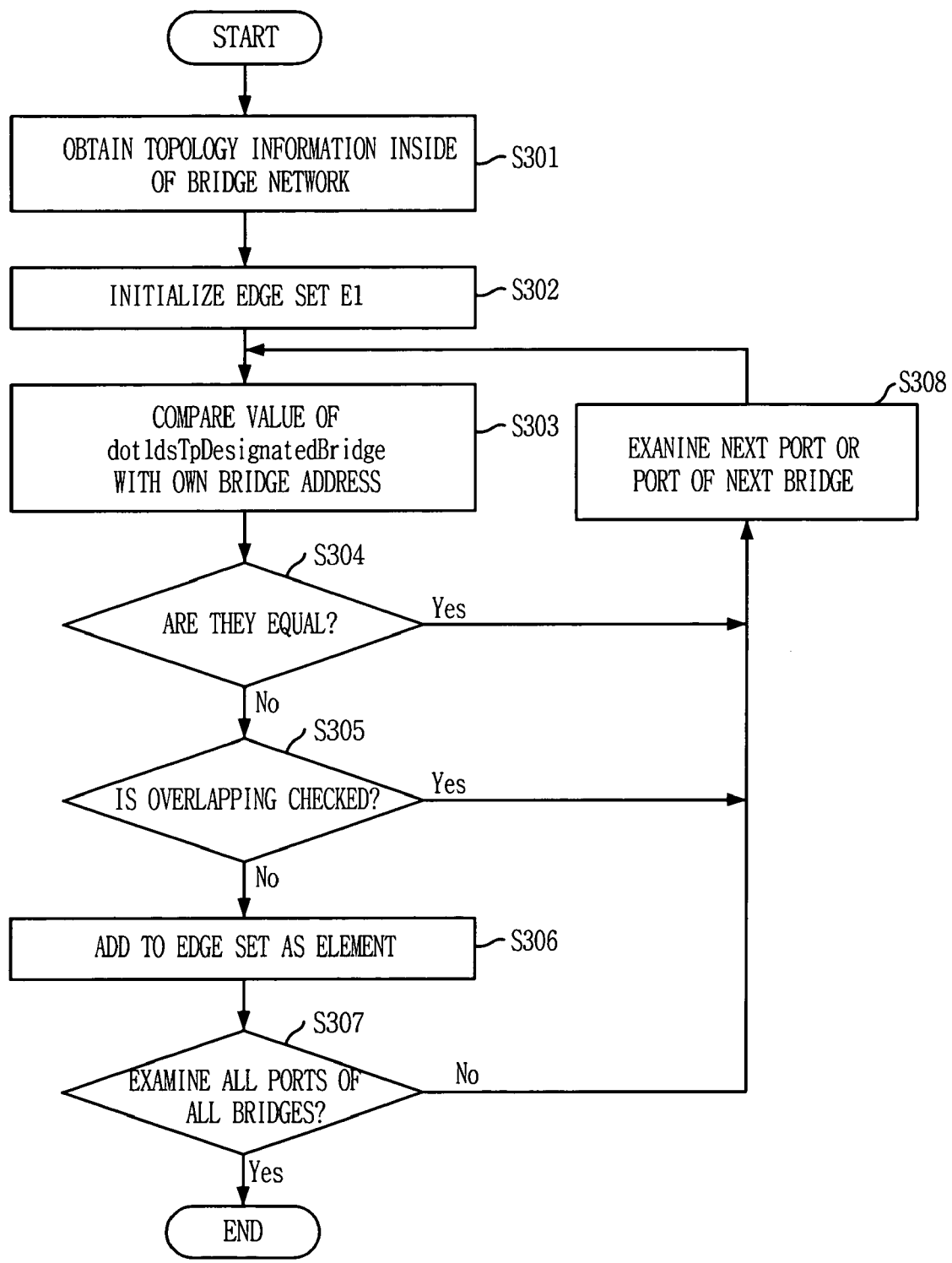
FIG. 3 is a flowchart illustrating a procedure for discovering a physical connection relationship between bridges of an Ethernet network topology discovery method in accordance with an embodiment of the present invention.

FIG. 3 is a flowchart illustrating a procedure for discovering a physical connection relationship between bridges of an Ethernet network topology discovery method in accordance with an embodiment of the present invention.

A "SwitchDB" for storing information about a topology inside the bridge network in "PeerBridgeDB" schema information which is defined in the step S204 is formed as follows.

SwitchDB={dot1dBridgeAddress, dot1dStpPort, dot1dStpPortDesignatedBridge}

Herein, the "dot1dBridgeAddress" is the bridge address of an agent, and the "dot1dStpPort" is a port that the STP is activated, and the "dot1dStpPortDesignatedBridge" is an address designating a peer bridge connected to the "dot1dStpPort", which is a port with activated STP is activated. In case that the agent receives a bridge protocol data unit (BPDU) with the port, the bridge address transmitting the BPDU is recorded in the "dot1dStpPortDesignatedBridge". Otherwise, the own bridge address of the agent is recorded. The STP has a characteristic that the BPDU reception is available regardless of the port state and the character is used for the peer bridge discovery.

At step S301, "SwitchDB", which is topology information inside the bridge network included in the "PeerBridgeDB", is acquired to discover the physical connection relationship between bridges, and at step S302, a universal set E1 of edges formed with a pair of own bridge and peer bridge is set up as an initial state before topology discovery.

At steps S303 and S304, each port of each bridge is examined and the "dot1dStpPortDesignatedBridge" value, which is an address designating a peer bridge connected to the port with activated STP, is compared with own bridge address. In the steps S303 and S304, if the values of "dot1dStpPortDesignatedBridge" are the same, the bridge is not a peer bridge. Thus, the logic flow goes back to the step S303 to examine the next port. Otherwise, it is checked again at step S305 if it has been examined before.

In the step S305, if not, it is added to edge set E1 composed of a pair of own bridge and peer bridge at step S306, and it is checked at step S307 if all ports of all bridges are examined. If it is not completed, the logic flow goes back to the step S303 to examine the next port or the next bridge. If all ports are examined, the logic flow is ended.

In the step S305, if it is overlapped, the next port is examined at the step 303. When the procedures are applied to all ports of all bridges, physical topology discovery with respect to the bridge network is completed.

An operation for discovering physical connection relationship between the edge bridge and the host network will be described hereinafter referring to FIG. 4.

Figure 4:
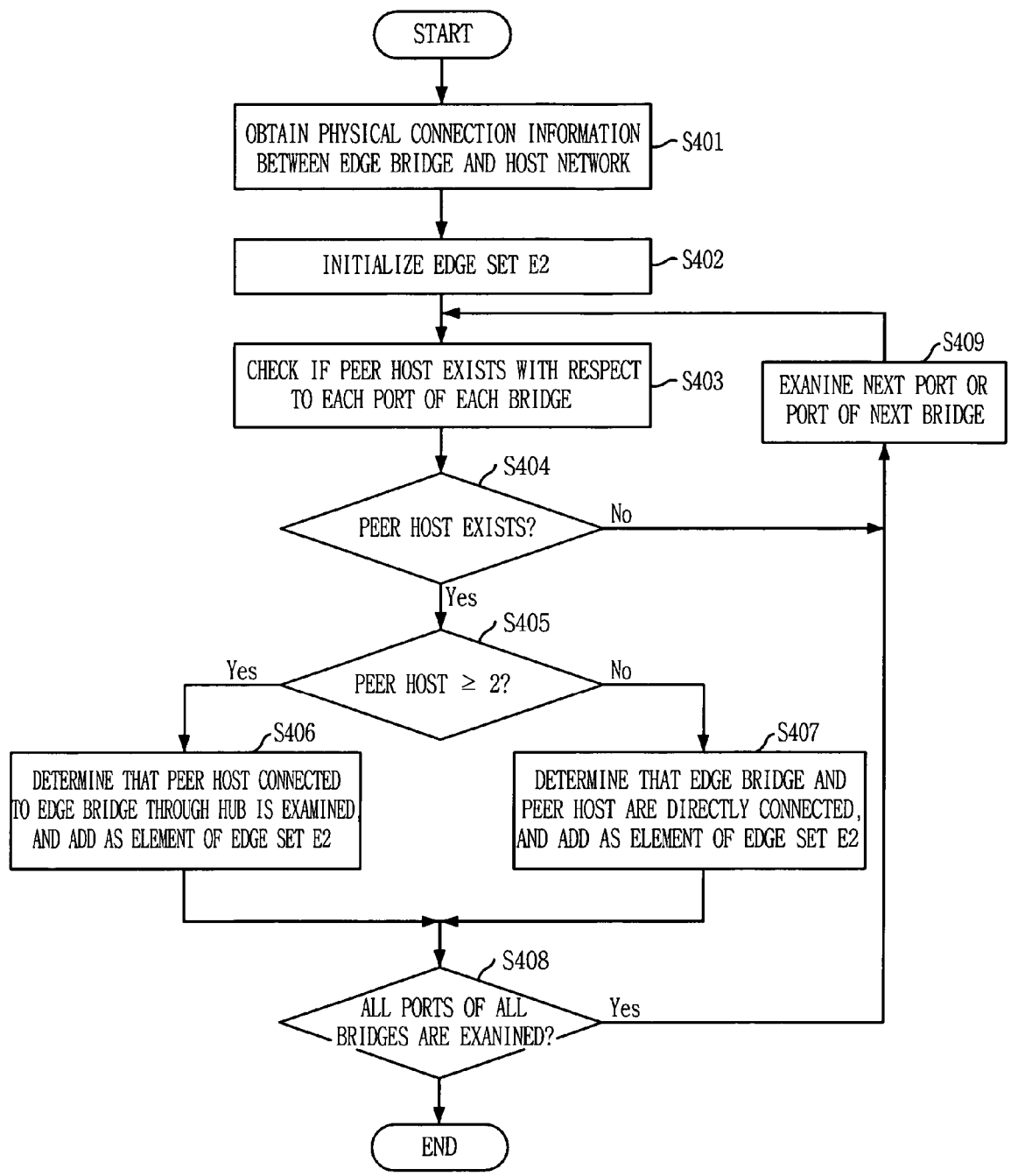
FIG. 4 is a flowchart illustrating a procedure for discovering physical connection relationship between the edge bridge and the host network of an Ethernet network topology discovery method in accordance with an embodiment of the present invention.

FIG. 4 is a flowchart illustrating a procedure for discovering physical connection relationship between the edge bridge and the host network of a topology discovery method in an Ethernet network in accordance with an embodiment of the present invention.

"HostDB" for storing connection information between the edge bridge and the host network of the "PeerHostDB" schema information defined an the step S306 is composed as follows.

HostDB={dot1dBridgeAddress, dot1dTpFdbAddress (or dot1dStaticAddress), dot1dTpFdbPort (or dot1dStaticReceivePort)}

Herein, the "dot1dTpFdbAddress" is a Media Access Control (MAC) address with respect to a dynamically address learning host or a router, and the "dot1dTpFdbPort" is a bridge port that the value is received. The "dot1dStaticAddress" and the "dot1dStaticReceivePort" put in parentheses are values that an operator inputs statically.

At step S401, the "HostDB" information, which is connection information between the edge bridge and the host network, is acquired to discover the physical connection relationship between the edge bridge and the host network. At step S402, a universal set E2 of edges, which are composed of a pair of edge bridge and host, is initialized into a state before the topology discovery.

At steps S403 and S404, it is checked whether the "dot1dTpFdbAddress" set up in the "HostDB", which is the MAC address with respect to the dynamically address learning host or the router, exists, by examining each port of each bridge and whether the peer host exists. If the peer host does not exist, at the step S403, the next port or next bridge is examined. Otherwise, it is checked whether the number of existing peer host is larger than two at step S405.

In the step S405, if the value of the each "dot1dTpFdbAddress" exists more than two, at step S406, it is determined that the peer host connected to the edge bridge through the hub is discovered, and the discovered pair of edge bridge and host is added to the universal set E2 as an element.

In the step S405, if the value of the "dot1dTpFdbAddress" exists only one, at step S407, it is determined that the host is directly connected to the edge bridge, and the discovered pair of edge bridge and host are added to the universal set E2 as an element.

At step S408, it is checked if all ports of all bridges are examined. If it is not completed, the step S403 is performed, otherwise, the procedure is ended.

If the procedures are applied to all ports of all bridges, the physical topology discovery with respect to the host network is completed. Herein, the STP of the ports is not activated and "ifOperStatus" is in the up-state.

The following equation 1 is a value calculating a size of an address learning address forwarding table (AFT) in the bridge which is positioned in the middle of the bridge network.

$$n(AFT_{CoreBridge}) = \sum_{activeport} n(AFT_{activeport'sDesignateBridge}) \qquad \text{Eq. 1}$$

The topology discovery method can discover the bridge network of the mesh structure based on the information acquired by the STP which is a part of the bridge MIB, and calculate the edge bridge. Since the AFT for the connection relationship with the host network is used with respect only to the calculated edge bridge network, an overhead mainly generated in the address learning in a middle core, just as in the equation 1, can be reduced. Since a standard simple network management protocol (SNMP) MIB is utilized, it is also possible to discover a physical topology with a device which is provided from various vendors forming the Ethernet network of the mesh structure.

The present invention can discover the topology with respect to the Ethernet network of the mesh structure without developing and using a separate control protocol by discovering the physical topology with respect to the bridge network and the host network based on the information acquired by the STP in the Ethernet network.

The present invention discovers the connection relationship with the host network by using the AFT with respect only to the discovered edge bridge network, thereby reducing the overhead generated in discovering the connection relationship with respect to the host network by using the AFT in the conventional middle core.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains object matter related to Korean patent application No. 2004-0107203, filed with the Korean Intellectual Property Office on Dec. 16, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A topology discovery method in an Ethernet network, comprising the steps of:
    a) acquiring an interface Management Information Base (MIB) and a bridge MIB upon a signal from outside requesting to start physical topology discovery with respect to the Ethernet network;
    b) defining and storing information for discovering a physical topology based on the acquired interface MIB and the Bridge MIB in a schema;
    c) discovering edge bridges that provides a border between a bridge network and a host network by using the schema;
    d) discovering the physical topology with respect to the bridge network by using the schema;
    e) discovering the connection relationship between the host network and the edge bridge included in the bridge network by using an address learning address forwarding table (AFT); and
    f) outputting the connection relationship of the bridge network and the host network as a graph.

2. The method as recited in claim 1, wherein the bridge schema defined to store the information regarding the topology inside the bridge network includes own bridge address of an agent, a port with activated spanning tree protocol (STP) and an address designating a peer bridge connected to the port with the activated STP in the step b).

3. The method as recited in claim 2, wherein the step d) includes the steps of:
    d1) acquiring a bridge schema defined to store the information regarding the topology inside the bridge network;
    d2) setting up a universal set E1 of edges each formed of a pair of own bridge and peer bridge into an initial state before a topology discovery by using the acquired bridge schema; and
    d3) examining each port of each bridge according to the acquired bridge schema and adding a pair of bridge and peer bridge to the edge set E1 as an element to avoid overlapping, wherein an address of the peer bridge connected to the port with the activated STP is different from an address of the own bridge.

4. The method as recited in claim 2, wherein the step e) includes the steps of:
    e1) discovering an edge bridge existing in the Ethernet network;
    e2) defining the host schema by acquiring the connection information between each edge bridge and the host network from a network management agent;
    e3) initializing a universal set E2 of edges each formed of a pair of edge bridge and host into a state before topology discovery by using the defined host schema; and
    e4) examining each port of each bridge based on the acquired host schema, and adding a pair of peer host and edge bridge having a multiplexed analog complex (MAC) address with respect to an dynamically address learning host or a router to the universal set E2 as an element by using an address learning address forwarding table.

5. The method as recited in claim 4, wherein the host schema includes the MAC address with respect to the dynamically address learning host or the router, a bridge port receiving the MAC address, a static address which is set by an operator and a static reception port.

6. The method as recited in claim 1, wherein the edge bridge, a bridge having more than one host and interface of devices of the Ethernet network, is an agent of which the number of interface having a "ifEntry.ifOperStatus" value of the interface MIB as 1 is larger than the number of an interface having a "dot1dStpPortEnable" value as 1.

7. The method as recited in claim 6, wherein the step e4) includes the steps of:
    e4-1) examining each port of each bridge based on the acquired host schema and retrieving a peer host having the MAC address with respect to the dynamically address learning host or the router by using the address learning table;
    e4-2) if the dynamically address learning host or the router with respect to the retrieved peer host has one MAC address, determining as a structure that the edge bridge and the host are directly connected, and adding a pair of edge bridge and host to the universal set E2 as an element; and
    e4-3) if the dynamically address learning host or the router with respect to the retrieved peer host has more than two MAC addresses, determining that the peer host connected to edge bridge through a hub is discovered, and adding a pair of edge bridge and host to the universal set E2 as an element.

* * * * *